No. 861,654. PATENTED JULY 30, 1907.
W. F. IRISH.
COVER ATTACHING MEANS FOR ELECTRICAL FLOOR BOXES.
APPLICATION FILED MAR. 15, 1906.

Witnesses
L. S. Shaw
G. Blake

Inventor
Wm. F. Irish
By his Attorneys
Bentley & Pierson

UNITED STATES PATENT OFFICE.

WILLIAM F. IRISH, OF DENVILLE, NEW JERSEY.

COVER-ATTACHING MEANS FOR ELECTRICAL FLOOR-BOXES.

No. 861,654.

Specification of Letters Patent.

Patented July 30, 1907.

Application filed March 15, 1906. Serial No. 306,122.

*To all whom it may concern:*

Be it known that I, WILLIAM F. IRISH, a citizen of the United States, residing at Denville, in the county of Morris and State of New Jersey, have invented certain new and useful Improvements in Cover-Attaching Means for Electrical Floor-Boxes, of which the following specification and accompanying drawing illustrate the invention in a form which I now regard as the best out of the various forms in which it may be embodied.

This invention relates to the construction of floor boxes adapted to contain a plug and socket, whereby an electric cord may be connected with wiring in the floor of an apartment. Such boxes may include a removable cover or cover-section for affording access to the internal plug and permitting its removal without taking off the whole top of the box or of that part which lies flush with the floor.

The object of the invention is to provide a construction whereby the cover may be quickly attached and removed and whereby greater durability is attained. Formerly it has been common to employ a threaded cover, but the screw threads soon became damaged under the rough usage which they encounter. Such boxes are usually made waterproof and my invention includes a waterproof construction.

Figure 1:
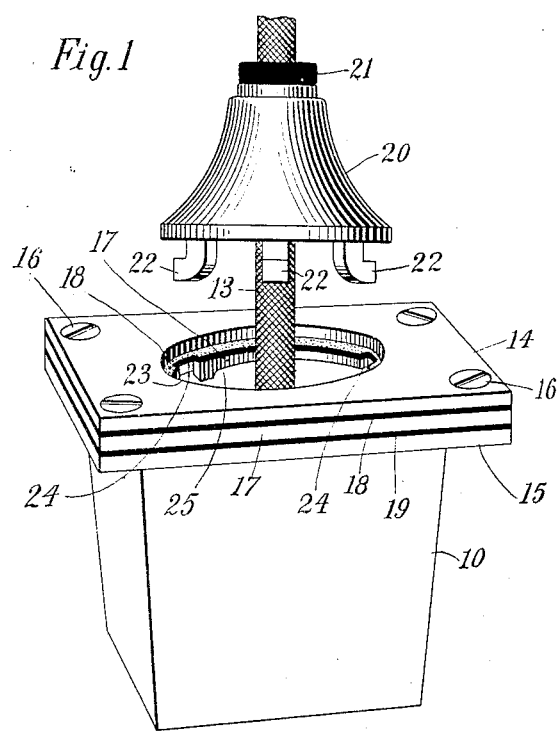
Figure 2:
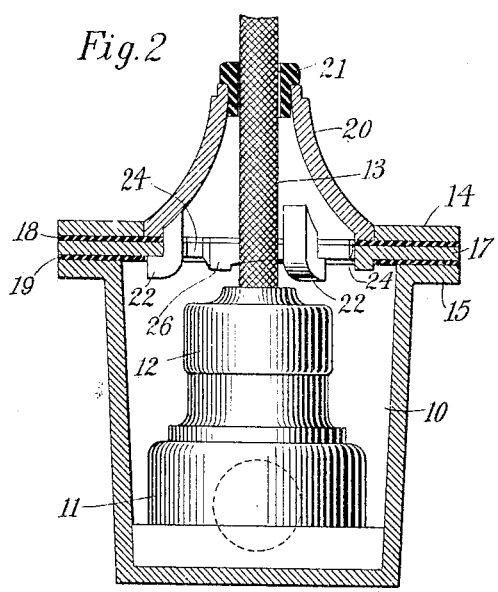
Figure 3:
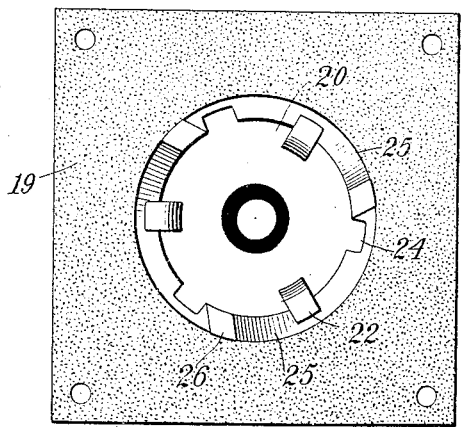

Of the accompanying drawings, Figure 1 represents a perspective view showing the box and its cover. Fig. 2 represents a vertical section of the box and cover connected; Fig. 3 represents a reverse plan view of the top part removed from the body of the box.

The same reference characters denote the same parts in all the figures.

In the drawings, 10 indicates the body of the floor box adapted to be sunk below the level of the floor and containing an electrical socket 11 fixed within the body of the box and a removable plug 12 fitting said socket and fixed on the end of a flexible conducting cord 13.

14 is a top-plate adapted to rest flush with the floor level and connected with a horizontal flange 15 on the upper edge of the box-body, by means of screws 16.

Between the flange and top-plate is a separate locking plate 17 and between the abutting faces of these plates and flange are located two layers or sheets 18 19 of rubber insulation. These insulating layers and the two plates 14 17 have a central hole 23 through them of sufficient size to enable the plug 12 to be readily applied and removed by hand, and this hole is filled by a raised bell-shaped cover 20 having an annular insulator 21 in its upper end, through which passes the cord 13. On the under side of said cover are formed three hooks 22 which extend downwardly to enter the hole 23 and point outwardly to engage the under edge of the plate 17. Said plate and the upper insulating layer 18 project within the margin of the hole in the top-plate 14 and are formed with notches 24 which allow the hooks 22 to pass vertically across the edges of said lower plate and upper insulating layer. Alongside of each notch 24 is formed on the under side of the plate 17 a cam incline 25, and at the extremity of each incline is a stop lug 26.

In operating this floor box, to apply the plug 12 and close the box, the cover 20 will be slid back on the cord 13 and the plug 12 inserted in socket 11. The hooks 22 should then be alined with the notches 24, and the cover 20 inserted in place and turned so that the hooks 22 ride on the inclines 25 and draw the lower rim of the cover 20 down tightly against the seat formed by the inwardly-projecting margin of plate 17 and insulating layer 18. Thus the box is closed water-tight at the floor level. When the cord 13 and plug 12 are removed, the cover 20 may remain on the cord and the hole 23 may then be filled with a flush or flat-topped cover which will have hooks or projections similar to the hooks 22 and be applied and removed in the same manner as cover 20.

It will be observed that the above construction permits the body of the box 10 to be cast in one piece, while the cam inclines for engaging the coupling-hooks are formed upon a separate piece, so that the whole device may be cheaply made.

What I claim as new and desire to secure by Letters Patent is:

1. An attaching device for covers of floor receptacles comprising, in combination with the body of the receptacle, a plate removably attached thereto and formed with a hole having engaging members around its edge, said plate also carrying a cover seat in opposition to said engaging members, and a cover for said body having complemental engaging members adapted to be inserted for engagement with the first-said members by an axial movement of said cover and engaged therewith by a subsequent rotary movement, the rotary movement binding the cover to its seat.

2. A fastening for floor boxes comprising, in combination with the body of the box, a top for the box formed with an aperture, cam inclines within the box surrounding said aperture, recesses separating said inclines, a cover-seat on said top opposite the inclines, and a cover having a complemental seat and hooks adjacent said complemental seat pointing outwardly and adapted to enter said recesses by an axial movement of the cover and engage said cam inclines by a rotatory movement thereof, means being provided for preventing the admission of liquid or moisture to said cam inclines.

3. An electrical floor box comprising, in combination, a body adapted to rest below the floor level and having a flange, an electrical connector-member mounted within said body, a flexible conductive cord having a complemental connector-member, a cover mounted to slide on said cord and having hooks projecting axially and outwardly, said cover when in place being raised above the floor level, a top-plate removably attached to the body flange and having an aperture to receive said cover, a locking plate of smaller aperture than said top-plate mounted between the top-plate and the flange and formed with cam inclines to engage said hooks and intervening recesses to admit the passage of the hooks, a layer of insulation mounted between the said plates and forming a seat for the cover, and a second layer of insulation mounted between the locking plate and the flange.

In testimony whereof I have hereunto set my hand in the presence of two subscribing witnesses, the second day of March, 1906.

WILLIAM F. IRISH.

Witnesses:
R. M. PIERSON,
G. W. HOPKINS.